United States Patent
Hettich

[15] 3,635,313
[45] Jan. 18, 1972

[54] TORSIONAL OSCILLATING DEVICES

[72] Inventor: Hugo Hettich, Postfach 46, Ludwigshafen/Bodensee, Germany

[22] Filed: Mar. 9, 1970

[21] Appl. No.: 17,382

[30] Foreign Application Priority Data

Mar. 18, 1969 Germany ................. P 19 13 745.2

[52] U.S. Cl. .................. 185/29, 185/37, 185/45 R, 58/107, 267/160, 60/9
[51] Int. Cl. .................................................. F03g 3/00
[58] Field of Search ............... 185/29, 37, 45, DIG. 1, 40 A; 60/7, 7 A, 9; 58/52, 107, 116; 267/154, 160

[56] References Cited

UNITED STATES PATENTS

| 3,324,645 | 6/1967 | Hettich | 58/107 X |
| 3,120,950 | 2/1964 | Hardison | 267/154 |
| 3,489,161 | 1/1970 | Rexford | 185/29 X |

*Primary Examiner*—Edgar W. Geoghegan
*Attorney*—Ostrolenk, Faber, Gerb & Soffen

[57] ABSTRACT

The specification describes torsional oscillating devices, for instance for use in clock escapements, in which an oscillating mass which is mounted on a torsional element is provided with a spring providing an additional restoring force.

5 Claims, 3 Drawing Figures

PATENTED JAN 18 1972  3,635,313

Inventor:
HUGO HETTICH
BY
OSTROLENK FABER GERB & SOFFEN
ATTORNEYS

TORSIONAL OSCILLATING DEVICES

BACKGROUND OF THE INVENTION

1. Field to which invention relates

The present invention relates to torsional oscillating devices as can be used more particularly in escapements of clocks such as wall and table clocks, and also in other timing devices.

A torsional oscillating device as the term is used in the present invention is a rotary pendulum in which a body forming the weight of the pendulum is attached as near to its center as possible on a wire or strip so that it can oscillate without any bearing friction and independently of the position of the arrangement. The restoring force provided by the elastic wire or strip is very limited, something which makes itself felt more particularly in applications in which the oscillating device is to be used in a wall or table clock.

2. The prior art

The restoring force can only be increased in the case of such prior art constructions if recourse is had to a thicker wire or strip but this leads to the disadvantage that the oscillating weight can only perform oscillation of very small amplitude. The use of a long wire or strip is, however, not possible in a clock, for example, owing to the amount of space required.

With a very small restoring force the mass of the oscillating body must, however, be made suitably small in size, this leading to the disadvantage that the kinetic energy of the oscillating mass is too small for the reliable operation of the hands of wall and table clocks, and the associated mechanism.

SHORT SUMMARY OF INVENTION

In order to avoid these difficulties the present invention provides a torsional swinging or oscillating device comprising a body arranged to oscillate on a torsional element and provided with a spring for providing an additional restoring force, so that despite the use of a wire or strip as the torsional element with a short length the oscillating mass can be made sufficiently large in order to ensure reliable operation of the clockwork mechanism of a clock.

As experience has shown a clock provided with such a torsional oscillating device operates with satisfactory accuracy; the clock is also not dependent upon the position in which it is held since the oscillating mass does not have any substantial center of gravity error. Finally it has been found, surprisingly, that a torsional oscillating device embodying the invention has no noticeable isosynchronism error and that this error can be practically eliminated by a suitable choice of the length of the wire and the wire thickness used for mounting the oscillating mass.

DESCRIPTION OF SEVERAL VIEWS OF DRAWING

Embodiments of the invention will now be described with reference to the accompanying drawings.

FIGS. 1, 2 and 3 of the drawing show diagrammatically in axial section various embodiments of a torsional oscillating device constructed in accordance with the invention, the drive means for operating the hand-driving mechanism of the clock being omitted since it does not form the subject matter of the invention.

DESCRIPTION OF PREFERRED EMBODIMENTS

Figure 1:
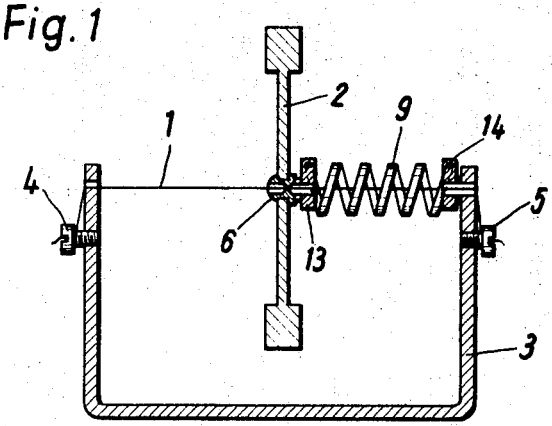

Referring now to the drawings and more particularly to FIG. 1 reference numeral 1 denotes a steel wire or strip which is mounted in a cradle 3 by means of screws 4 and 5 which hold it in a tensioned state. The wire is connected by means of a hub element 6 with the swinging or oscillating mass 2 so that there is a firm connection between the mass 2 and the wire 1.

The hub element 6 has a collar 13 with a central hole through which the wire 1 is passed. On the collar 13 one end of a helical spring 9, which provides a restoring force, is attached. The other end of the spring 9 is attached to the cradle 3 in a fixed manner at 14.

Figure 2:
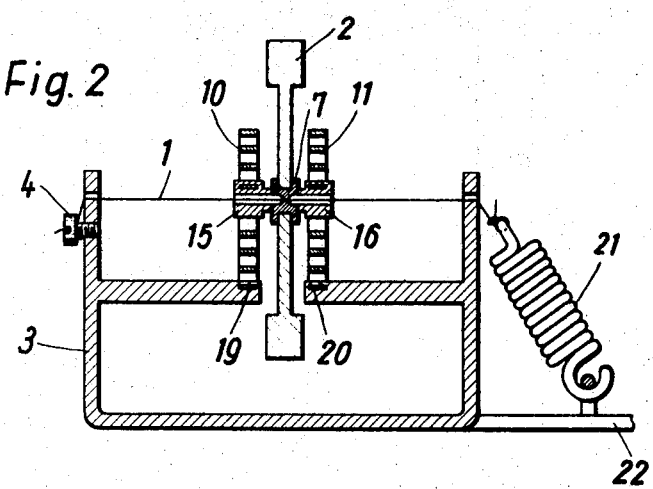

The construction in accordance with FIG. 2 differs from the described construction in that the restoring force is provided by two spiral springs 10 and 11 which are connected with the cradle 3 at 19 and 20 while their inner ends are connected with projections 15 and 16 of the hub element 7 of the oscillating mass 2. Reference numeral 21 denotes a tensioning spring which holds the wire 1 under a constant tension and may be provided with means for regulating its tensioning action. Instead of the two spiral springs 10 and 11 it is possible to provide a spring only on one side of the mass 2. Similarly in the case of the embodiment in accordance with FIG. 1 helical springs 9 can be provided on both sides of the oscillating mass 2.

Figure 3:
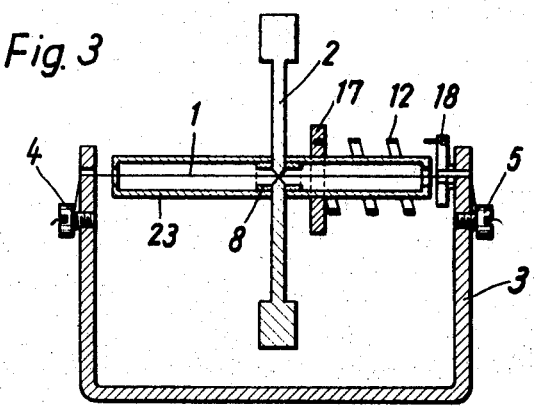

FIG. 3 shows a construction which is substantially similar to that of FIG. 1. It is, however, provided with a protective tube 23 which is connected with the oscillating mass 2 in a fixed manner and at its ends is provided with openings through which the wire 1 passes. In this manner the oscillating device is protected from damage due to shaking as may occur in the transport. The inner hub element of the oscillating mass, which connects it with the wire 1 in a firm manner is denoted by reference numeral 8. The parts 12, 17 and 18 correspond to the parts 9, 13 and 14 of FIG. 1.

Preferably the parts are so dimensioned that the restoring force of the tension wire 1 is only very small as compared with the restoring force of the restoring spring 9, 10, 11 or 12, for example, only 0.3 percent of it, or under 1 percent of it. Thus the connection between the wire and the oscillating mass is only subjected to small stresses.

The oscillating mass can be driven mechanically by conventional means, or by means employing electrical contacts or transistors, the kinetic energy of the oscillating mass being sufficient for operating the hand-driving mechanism of a wall or table clock or starting the alarm mechanism of an alarm, i.e., the oscillating mass serves as a balance wheel.

What I claim is:

1. In a torsional oscillating device, comprising an oscillating mass, a support for said mass which is connected thereto and a spring means connected to said mass for providing restoring force to said mass,
   the improvement comprising, said support for said mass comprising spaced apart support means and a torsional element which has a constant torsion characteristic and is carried by said spaced apart support means; said mass being firmly affixed to said element such that oscillation of said mass correspondingly oscillates said element and such that said spring means provides additional restoring force in addition to the restoring force provided by said element.

2. In the torsional oscillating device of claim 1, the improvement further comprising, said element comprising an elongated elastic strip.

3. A device in accordance with claim 1 in which said spring means is a helical spring surrounding said torsional element.

4. A device in accordance with claim 1 in which said spring means comprises at least one spiral spring arranged on at least one side of said oscillating mass.

5. A device in accordance with claim 1 in which said torsional element has a characteristic so as to provide a restoring force of less than 1 percent of the restoring force provided by said spring means.

* * * * *